United States Patent
Xu et al.

(10) Patent No.: US 12,517,180 B1
(45) Date of Patent: Jan. 6, 2026

(54) TESTING APPARATUS AND CHARGING SYSTEM

(71) Applicant: CONTEMPORARY AMPEREX TECHNOLOGY (HONG KONG) LIMITED, Hong Kong (CN)

(72) Inventors: Jinmei Xu, Ningde (CN); Zhimin Zheng, Ningde (CN); Yong Cheng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/091,257

(22) Filed: Mar. 26, 2025

Related U.S. Application Data

(63) Continuation of application No. PCT/CN2024/110392, filed on Aug. 7, 2024.

(30) Foreign Application Priority Data

Jul. 8, 2024 (CN) .......................... 202421598488.8

(51) Int. Cl.
*H02J 7/00* (2006.01)
*B60L 55/00* (2019.01)
(Continued)

(52) U.S. Cl.
CPC ............ *G01R 31/382* (2019.01); *B60L 55/00* (2019.02); *G01R 31/364* (2019.01); *H02J 7/342* (2020.01); *H02J 3/32* (2013.01)

(58) Field of Classification Search
CPC ..... G01R 31/382; G01R 31/364; B60L 55/00; H02J 7/342; H02J 3/32
(Continued)

(56) References Cited

U.S. PATENT DOCUMENTS

| 2014/0055143 A1 | 2/2014 | Shieh et al. |
| 2017/0264125 A1* | 9/2017 | Hsieh .................... H02J 7/0068 |
| 2019/0288534 A1* | 9/2019 | Gao .................... H01M 10/425 |

FOREIGN PATENT DOCUMENTS

| CN | 104198953 A | 12/2014 | |
| CN | 116626413 A * | 8/2023 | ............. G01R 31/00 |

(Continued)

OTHER PUBLICATIONS

The World Intellectual Property Organization (WIPO) International Search Report and Written Opinion for PCT/CN2024/110392 Sep. 1, 2024 12 Pages (including translation).

*Primary Examiner* — Zixuan Zhou
(74) *Attorney, Agent, or Firm* — ANOVA LAW GROUP, PLLC

(57) ABSTRACT

A testing apparatus is configured to perform a charge and discharge test on a first energy storage and charging device having a first charging interface and a second energy storage and charging device having a second charging interface. The testing apparatus includes a connecting unit configured to connect power interfaces in the first charging interface and the second charging interface, so as to electrically connect the first energy storage and charging device and the second energy storage and charging device; and a test control unit configured to connect to signal interfaces in the first charging interface and the second charging interface to separately communicate with the first energy storage and charging device and the second energy storage and charging device, so as to control the first energy storage and charging device and the second energy storage and charging device for the charge and discharge test.

10 Claims, 6 Drawing Sheets

(51) Int. Cl.
    *G01R 31/364*    (2019.01)
    *G01R 31/382*    (2019.01)
    *H02J 7/34*       (2006.01)
    *H02J 3/32*       (2006.01)

(58) Field of Classification Search
    USPC .......................... 320/101, 103, 109; 701/22
    See application file for complete search history.

(56) References Cited

FOREIGN PATENT DOCUMENTS

| | | | | |
|---|---|---|---|---|
| CN | 117741488 A | 3/2024 | | |
| EP | 4119960 B1 * | 4/2024 | ............ | H02J 7/0013 |
| WO | 2024138930 A1 | 7/2024 | | |

* cited by examiner

TESTING APPARATUS AND CHARGING SYSTEM

CROSS-REFERENCE TO RELATED APPLICATIONS

This application is a continuation of International Application No. PCT/CN2024/110392, filed on Aug. 7, 2024, which claims priority to Chinese Patent Application No. 202421598488.8, filed with the China National Intellectual Property Administration on Jul. 8, 2024 and entitled "TESTING APPARATUS AND CHARGING SYSTEM", both of which are incorporated herein by reference in their entirety.

TECHNICAL FIELD

This disclosure relates to the technical field of charge and discharge tests, and in particular to a testing apparatus and a charging system.

BACKGROUND

Currently, when high-power charging piles are maintained and debugged, it is needed to simulate high-power charging, which leads to large-sized and high-cost simulation devices and is not conducive to on-site maintenance and debugging.

SUMMARY

In view of the above problem, this disclosure provides a testing apparatus and a charging system. The testing apparatus electrically connects the two energy storage and charging devices and communicates with the two energy storage and charging devices to control the two energy storage and charging devices for charge and discharge, thus implementing a bidirectional charge and discharge test on the two energy storage and charging devices. Additionally, the testing apparatus features a convenient test, a small volume, and low costs, thereby facilitating on-site maintenance and debugging.

According to a first aspect, this disclosure provides a testing apparatus for performing a charge and discharge test on a first energy storage and charging device and a second energy storage and charging device, where the first energy storage and charging device has a first charging interface, and the second energy storage and charging device has a second charging interface. The apparatus includes: a connecting unit, where the connecting unit is configured to connect a power interface in the first charging interface and a power interface in the second charging interface, so as to electrically connect the first energy storage and charging device and the second energy storage and charging device; and a test control unit, where the test control unit is configured to connect to a signal interface in the first charging interface and a signal interface in the second charging interface to separately communicate with the first energy storage and charging device and the second energy storage and charging device, so as to control the first energy storage and charging device and the second energy storage and charging device for the charge and discharge test.

In the technical solutions of the embodiments of this disclosure, the power interfaces in the charging interfaces of two energy storage and charging devices are connected via the connecting unit, so as to electrically connect the two energy storage and charging devices. The test control unit is separately connected to the signal interfaces in the charging interfaces of the two energy storage and charging devices, so as to separately communicate with the two energy storage and charging devices, thus performing the charge and discharge test on the two energy storage and charging devices. Thus, the testing apparatus electrically connects the two energy storage and charging devices and communicates with the two energy storage and charging devices to control the two energy storage and charging devices for charge and discharge, thus implementing the bidirectional charge and discharge test on the two energy storage and charging devices, ensuring a convenient test. Additionally, the testing apparatus has a small volume and low costs, thereby facilitating on-site maintenance and debugging.

In some embodiments, during the charge and discharge test, the first energy storage and charging device is in a charging mode, and the second energy storage and charging device is in a V2X mode, so as to perform a charging function test on the first energy storage and charging device and a V2X function test on the second energy storage and charging device; or the second energy storage and charging device is in a charging mode, and the first energy storage and charging device is in a V2X mode, so as to perform a charging function test on the second energy storage and charging device and a V2X function test on the first energy storage and charging device. In this way, the testing apparatus can implement the charging function and V2X function tests on the energy storage and charging devices.

In some embodiments, the first energy storage and charging device includes a first energy storage unit and a first power conversion unit, where the first energy storage unit is electrically connected to a direct-current bus, and the first power conversion unit is electrically connected to both the direct-current bus and the power interface in the first charging interface. The second energy storage and charging device includes a second energy storage unit and a second power conversion unit, where the second energy storage unit is electrically connected to the direct-current bus, and the second power conversion unit is electrically connected to both the direct-current bus and the power interface in the second charging interface. When the first energy storage and charging device is in the charging mode, and the second energy storage and charging device is in a V2V mode, an electrical energy of the first energy storage unit is transmitted to the second energy storage unit sequentially through the direct-current bus, the first power conversion unit, the first charging interface, the connecting unit, the second charging interface, the second power conversion unit, and the direct-current bus; and when the second energy storage and charging device is in the charging mode, and the first energy storage and charging device is in a V2V mode, an electrical energy of the second energy storage unit is transmitted to the first energy storage unit sequentially through the direct-current bus, the second power conversion unit, the second charging interface, the connecting unit, the first charging interface, the first power conversion unit, and the direct-current bus. In this way, the testing apparatus can implement the charging function and V2V function tests on the energy storage and charging devices, and because the two energy storage and charging devices share the direct-current bus, the tests can be performed without an alternating-current grid.

In some embodiments, the first energy storage unit is electrically connected to the direct-current bus via a first switch, and the second energy storage unit is electrically connected to the direct-current bus via a second switch. The first energy storage and charging device further includes a third power conversion unit, and the third power conversion unit is electrically connected to both the direct-current bus and the alternating-current grid. The second energy storage and charging device further includes a fourth power conversion unit, and the fourth power conversion unit is electrically connected to both the direct-current bus and the alternating-current grid. When the first energy storage and charging device is in a charging mode and the second energy storage and charging device is in a V2G mode, the first switch is connected, and the electrical energy of the first energy storage unit is transmitted to the alternating-current grid sequentially through the direct-current bus, the first power conversion unit, the first charging interface, the connecting unit, the second charging interface, the second power conversion unit, the direct-current bus, and the fourth power conversion unit. When the second energy storage and charging device is in a charging mode and the first energy storage and charging device is in a V2G mode, the second switch is connected and the electrical energy of the second energy storage unit is transmitted to the alternating-current grid sequentially through the direct-current bus, the second power conversion unit, the second charging interface, the connecting unit, the first charging interface, the first power conversion unit, the direct-current bus, and the third power conversion unit. In this way, the testing apparatus can implement the V2G function test on the energy storage and charging devices.

In some embodiments, the first energy storage and charging device further includes a third switch, and the third switch is connected to both the direct-current bus and the power interface in the first charging interface. The second energy storage and charging device further includes a fourth switch, and the fourth switch is connected to both the direct-current bus and the power interface in the second charging interface. When the first energy storage and charging device is in the charging mode, and the second energy storage and charging device is in a V2G mode, the fourth switch is connected and the second power conversion unit does not operate, or the fourth switch is opened and the second power conversion unit operates. Alternatively, when the second energy storage and charging device is in the charging mode, and the first energy storage and charging device is in the V2G mode, the third switch is connected and the first power conversion unit does not operate, or the third switch is opened and the first power conversion unit operates. In this way, the V2G function test can be performed on the energy storage and charging devices for different pathways.

In some embodiments, the direct-current bus is also configured to connect to an energy storage and supplement device. When the first energy storage and charging device is in the charging mode, and the second energy storage and charging device is in a V2L mode, the first switch is connected, and an electrical energy of the first energy storage unit is transmitted to the energy storage and supplement device sequentially through the direct-current bus, the first power conversion unit, the first charging interface, the connecting unit, the second charging interface, the second power conversion unit, and the direct-current bus; and when the second energy storage and charging device is in the charging mode, and the first energy storage and charging device is in a V2L mode, the second switch is connected, and an electrical energy of the second energy storage unit is transmitted to the energy storage and supplement device sequentially through the direct-current bus, the second power conversion unit, the second charging interface, the connecting unit, the first charging interface, the first power conversion unit, and the direct-current bus. In this way, the V2L function test can be performed on the energy storage and charging devices.

In some embodiments, the connecting unit includes a positive power wire and a negative power wire. Two ends of the positive power wire are configured to connect to a positive power interface in the first charging interface and a positive power interface in the second charging interface respectively, and two ends of the negative power wire are configured to connect to a negative power interface in the first charging interface and a negative power interface in the second charging interface respectively. In this way, the connecting unit can electrically connect the two energy storage and charging devices quickly and conveniently, and the connecting unit has a simple structure and low costs.

In some embodiments, the test control unit includes a communication assembly, and the communication assembly supports multiple communication protocols to allow the test control unit to communicate with different first energy storage and charging devices and second energy storage and charging devices. In this way, the universality of the test control unit can be improved.

In some embodiments, the first energy storage and charging device includes a first control unit, the second energy storage and charging device includes a second control unit, and the test control unit separately communicates with the first control unit and the second control unit, to control the first energy storage and charging device and the second energy storage and charging device for the charge and discharge test via the first control unit and the second control unit.

According to a second aspect, this disclosure provides a charging system, including: a first energy storage and charging device, where the first energy storage and charging device has a first charging interface; and a second energy storage and charging device, where the second energy storage and charging device has a second charging interface. During the charge and discharge test on the first energy storage and charging device and the second energy storage and charging device, the above testing apparatus is used to connect to the first charging interface and the second charging interface, to perform the charge and discharge test on the first energy storage and charging device and the second energy storage and charging device.

The foregoing description is merely an overview of the technical solution of this disclosure. For a better understanding of the technical means in this disclosure such that they can be implemented according to the content of the specification, and to make the above and other objectives, features, and advantages of this disclosure more obvious and easier to understand, the following describes specific embodiments of this disclosure.

BRIEF DESCRIPTION OF DRAWINGS

Persons of ordinary skill in the art will be clear about various other advantages and benefits by reading the detailed description of the embodiments below. The accompanying drawings are merely intended to illustrate embodiments and are not intended to limit this disclosure. In addition, in all the accompanying drawings, the same reference signs represent the same components. In the accompanying drawings.

DESCRIPTION OF EMBODIMENTS

Figure 1:
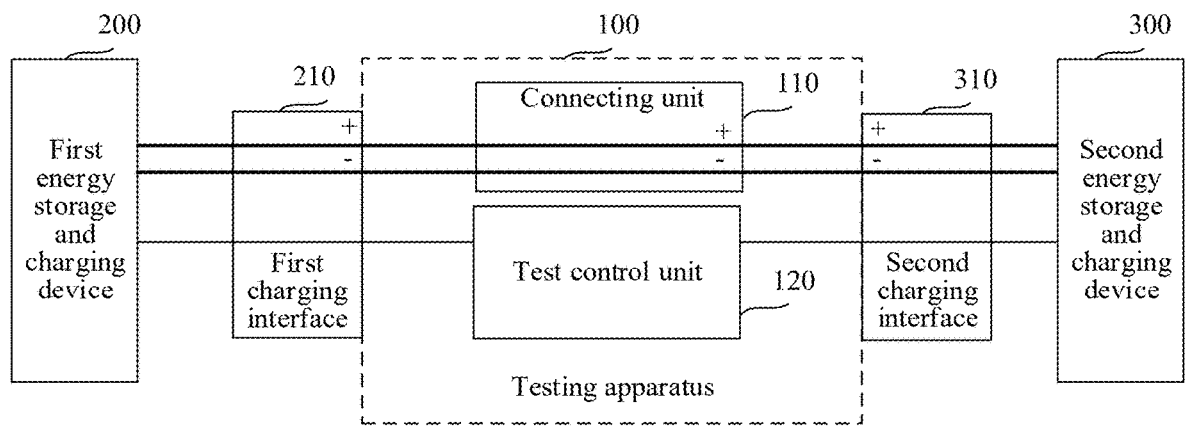
FIG. 1 is a schematic structural diagram of a testing apparatus according to a first embodiment of this disclosure.

The following describes in detail embodiments of technical solutions of this disclosure with reference to the accompanying drawings. The following embodiments are merely used to describe technical solutions of this disclosure more explicitly, and therefore they are merely used as examples and do not constitute any limitations on the protection scope of this disclosure.

Unless otherwise defined, all technical and scientific terms used herein shall have the same meanings as commonly understood by those skilled in the art to which this disclosure relates. The terms used herein are intended to merely describe the specific embodiments rather than to limit this disclosure. The terms "include" and "have" and any other variations thereof in the specification, claims and brief description of drawings of this disclosure are intended to cover non-exclusive inclusions.

In the descriptions of the embodiments of this disclosure, the technical terms "first", "second", and the like are merely intended to distinguish between different objects, and shall not be understood as any indication or implication of relative importance or any implicit indication of the number, specific sequence, or primary-secondary relationship of the technical features indicated. In the description of the embodiments of this disclosure, "multiple" means at least two unless otherwise specifically stated.

In this specification, reference to "embodiment" means that specific features, structures or characteristics described with reference to the embodiment may be incorporated in at least one embodiment of this disclosure. The word "embodiment" appearing in various places in this specification does not necessarily refer to the same embodiment or an independent or alternative embodiment that is exclusive of other embodiments. Persons skilled in the art explicitly and implicitly understand that the embodiments described herein may be combined with other embodiments.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, a character "/" in this specification generally indicates an "or" relationship between contextually associated objects.

In the descriptions of the embodiments of this disclosure, the term "multiple" means more than two (inclusive). Similarly, "multiple groups" means more than two (inclusive) groups, and "multiple pieces" means more than two (inclusive) pieces.

In the description of the embodiments of this disclosure, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this disclosure rather than indicating or implying that the means or components mentioned must have specific orientations or must be constructed or manipulated according to specific orientations, and therefore shall not be construed as any limitations on embodiments of this disclosure.

In the description of the embodiments of this disclosure, unless otherwise specified and defined explicitly, the terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this disclosure as appropriate to specific situations.

Currently, when high-power charging piles are maintained and debugged, it is needed to simulate high-power charging, which leads to large-sized and high-cost simulation devices and is not conducive to on-site maintenance and debugging. For example, a high-power simulation device needs to be set up specially to cooperate with a high-power charging pile for a test. When it is needed to maintain and debug the high-power charging pile, the high-power simulation device needs to be transported to the site, and then the high-power charging pile is maintained and debugged using the high-power simulation device. However, because the simulation device is a high-power device with a large size, it is not conducive to on-site maintenance and debugging and also has high costs.

Based on this, this disclosure provides a testing apparatus. The testing apparatus electrically connects two energy storage and charging devices and communicates with the two energy storage and charging devices to control the two energy storage and charging devices for charge and discharge, achieving the bidirectional charge and discharge test of the two energy storage and charging devices. Additionally, because the testing apparatus is mainly configured to achieve electrical connection and communicative connection of the two energy storage and charging devices and corresponding test control, it allows for a convenient test and has a small volume and low costs, thereby facilitating on-site maintenance and debugging.

The testing apparatus disclosed in the embodiments of this disclosure can be used to perform a charge and discharge test on both high-power energy storage and charging devices and low-power energy storage and charging devices, thus having a wide application range. The energy storage and charging devices can include charging piles, integrated charging and storage machines, or the like, and can be used to charge high-power devices that require fast charging or super-fast charging, such as electric vehicles, electric ships, and power tools, or to charge devices that require no fast charging or super-fast charging, such as electric vehicles, electric ships, and power tools.

The following describes the testing apparatus of this disclosure with reference to specific embodiments.

FIG. 1 is a schematic structural diagram of a testing apparatus 100 according to an embodiment of this disclosure.

Referring to FIG. 1, the testing apparatus 100 is configured to perform a charge and discharge test on a first energy storage and charging device 200 and a second energy storage and charging device 300. The first energy storage and charging device 200 has a first charging interface 210, and the second energy storage and charging device 300 has a second charging interface 310.

The testing apparatus 100 may include a connecting unit 110 and a test control unit 120. The connecting unit 110 is configured to connect a power interface in the first charging interface 210 and a power interface in the second charging interface 310, so as to electrically connect the first energy storage and charging device 200 and the second energy storage and charging device 300; and the test control unit 120 is configured to connect to a signal interface in the first charging interface 210 and a signal interface in the second charging interface 310 to separately communicate with the first energy storage and charging device 200 and the second energy storage and charging device 300, so as to control the first energy storage and charging device 200 and the second energy storage and charging device 300 for the charge and discharge test.

Specifically, the connecting unit 110 is mainly configured to electrically connect the first energy storage and charging device 200 and the second energy storage and charging device 300. Specifically, it can electrically connect the power interfaces in the first charging interface 210 and the second charging interface 310 to enable the flow of electrical energy between the first energy storage and charging device 200 and the second energy storage and charging device 300. The test control unit 120 is mainly configured to communicate with the first energy storage and charging device 200 and the second energy storage and charging device 300. Specifically, it can be separately connected to the signal interfaces in the first charging interface 210 and the second charging interface 310, to send test instructions to the first energy storage and charging device 200 and the second energy storage and charging device 300, thus implementing the charge and discharge test on the first energy storage and charging device 200 and the second energy storage and charging device 300.

For example, during the test, the first energy storage and charging device 200 may be controlled to be in a discharging state, and the second energy storage and charging device 300 may be controlled to be in a charging state, so as to perform a charging function test on the first energy storage and charging device 200. Alternatively, the second energy storage and charging device 300 may be controlled to be in a discharging state, and the first energy storage and charging device 200 may be controlled to be in a charging state, so as to perform a charging function test on the second energy storage and charging device 300.

In the above embodiment, the testing apparatus is mainly configured to achieve electrical connection of the two energy storage and charging devices and communicative connection with the two energy storage and charging devices, to send test instructions to the two energy storage and charging devices, so as to perform charge and discharge control over the two energy storage and charging devices, thereby implementing the charge and discharge test on the two energy storage and charging devices. The testing apparatus is mainly configured for electrical connection, communicative connection, and instruction issuing, and requires no other devices such as a high-voltage battery or a high-power converter, so it has a small volume and low costs. In addition, during the test, the charging interfaces of the two energy storage and charging devices are merely connected to the testing apparatus, which allows for convenient operation and facilitates on-site maintenance and debugging.

It can be understood that the first charging interface 210 and the second charging interface 310 are each typically a standard charging interface including a power interface and a signal interface. Therefore, interfaces matching the standard charging interfaces can be provided on a box of the testing apparatus 100. Thus, during the test, the first charging interface 210 and the second charging interface 310 are directly connected to the interfaces of the testing apparatus 100, allowing for more convenient operation.

Figure 2:
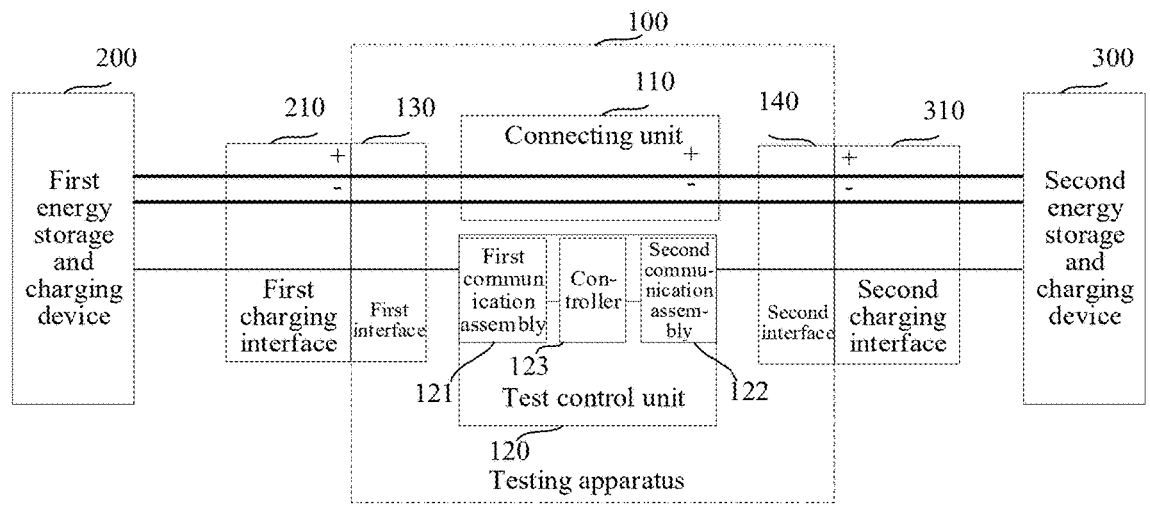
FIG. 2 is a schematic structural diagram of a testing apparatus according to a second embodiment of this disclosure.

For example, referring to FIG. 2, the testing apparatus 100 further includes a first interface 130 and a second interface 140. The first interface 130 matches the first charging interface 210, and the second interface 140 matches the second charging interface 310. During the test, the first charging interface 210 is connected to the first interface 130, and the second charging interface 310 is connected to the second interface 140, ensuring sample operation and convenient disassembly.

It should be noted that the first interface 130 and the second interface 140 may be embedded in the box of the testing apparatus 100 or protrude from the box of the testing apparatus 100, and the specific arrangement position is not limited.

In some embodiments, still referring to FIG. 1, the connecting unit 110 includes a positive power wire (+) and a negative power wire (−). Two ends of the positive power wire are configured to connect to a positive power interface in the first charging interface 210 and a positive power interface in the second charging interface 310, and two ends of the negative power wire are configured to connect to a negative power interface in the first charging interface 210 and a negative power interface in the second charging interface 310.

In this embodiment, the connecting unit is formed by two power wires. The two energy storage and charging devices can be electrically connected only using the two power wires for the charge and discharge test, without arranging other devices such as a high-voltage battery or a high-power converter, ensuring a simple structure and low costs.

In some embodiments, during the charge and discharge test, the first energy storage and charging device 200 is in a charging mode, and the second energy storage and charging device 300 is in a V2X mode, so as to perform a charging function test on the first energy storage and charging device 200 and a V2X function test on the second energy storage and charging device 300; or the second energy storage and charging device 300 is in a charging mode, and the first energy storage and charging device 200 is in a V2X mode, so as to perform a charging function test on the second energy storage and charging device 300 and a V2X function test on the first energy storage and charging device 200.

It should be noted that the charging mode refers to a mode where corresponding energy storage and charging devices discharge externally. The V2X (Vehicle to X, Vehicle-to-Everything) mode refers to a mode where energy storage and charging devices transmit an electrical energy of a vehicle to other devices, including but not limited to V2V (Vehicle to Vehicle, Vehicle to Vehicle) mode, V2G (Vehicle to Grid, Vehicle to Grid) mode, V2L (Vehicle to Load, Vehicle to Load) mode, and V2H (Vehicle to Home, Vehicle to Home) mode, which are specifically determined based on structures and functions of two energy storage and charging devices, as well as other devices connected thereto. For example, the energy storage and charging device has an energy storage unit and can operate in the V2V mode; the energy storage and charging device is connected to a power grid and can operate in the V2G mode; the energy storage and charging device is connected to a load and can operate in the V2L mode; and the energy storage and charging device is connected to a user's home and can operate in the V2H mode.

For example, an energy storage and charging device operates in the V2V mode. The test control unit 120 can control the first energy storage and charging device 200 to be in the charging mode while controlling the second energy storage and charging device 300 to be in the V2V mode. In this case, the first energy storage and charging device 200 discharges and transmits the electrical energy to the second energy storage and charging device 300 through the first charging interface 210, the connecting unit 110, and the second charging interface 310, and the second energy storage and charging device 300 charges an internal energy storage unit based on electrical energy released from the first energy storage and charging device 200. Relative to the first energy storage and charging device 200, the second energy storage and charging device 300 is equivalent to a vehicle, thus implementing the charging function test on the first energy storage and charging device 200. Relative to the second energy storage and charging device 300, the first energy storage and charging device 200 is equivalent to a vehicle, thus implementing the V2V function test on the second energy storage and charging device 300.

Similarly, the test control unit 120 can control the second energy storage and charging device 300 to be in the charging mode while controlling the first energy storage and charging device 200 to be in the V2V mode. In this case, the second energy storage and charging device 300 discharges and transmits the electrical energy to the first energy storage and charging device 200 through the second charging interface 310, the connecting unit 110, and the first charging interface 210, and the first energy storage and charging device 200 charges an internal energy storage unit based on electrical energy released from the second energy storage and charging device 300. Relative to the second energy storage and charging device 300, the first energy storage and charging device 200 is equivalent to a vehicle, thus implementing the charging function test on the second energy storage and charging device 300. Relative to the first energy storage and charging device 200, the second energy storage and charging device 300 is equivalent to a vehicle, thus implementing the V2V function test on the first energy storage and charging device 200.

It should be noted that for other V2X modes, reference is made to the relevant description of the V2V mode, which is not specifically elaborated herein.

In this embodiment, based on the testing apparatus, the charging function of one energy storage and charging device and the V2X function of the other energy storage and charging device can be tested through one test. The charging functions and V2X functions of the two energy storage and charging devices can be tested through two tests, ensuring a fast test speed.

In some embodiments, the test control unit 120 includes a communication assembly, and the communication assembly supports multiple communication protocols to allow the test control unit 120 to communicate with different first energy storage and charging devices 200 and second energy storage and charging devices 300, thus improving the universality of the test control unit 120.

For example, the communication assembly supports standard charging protocols and standard V2X protocols, such as the national standard protocol, such that the test control unit 120 can communicate with the corresponding energy storage and charging devices in accordance with the standard charging protocol and standard V2X protocol. Alternatively, the communication assembly supports user-customized charging protocols and V2X protocols to enable the test control unit 120 to meet actual needs.

For example, an energy storage and charging device operates in the V2V mode. The test control unit 120 can simulate a BMS (Battery Management System, Battery Management System) of a vehicle to communicate with the first energy storage and charging device 200 in accordance with the national standard charging protocol, so as to send corresponding test instructions to the first energy storage and charging device 200. The test instructions include, but are not limited a charging mode (a trickle charging mode, a constant-voltage charging mode, or the like) of the first energy storage and charging device 200, and charging parameters: charging voltage, charging current, and charging power. In addition, the test control unit 120 can simulate the BMS of the vehicle to communicate with the second energy storage and charging device 300 in accordance with the national standard V2V protocol, so as to send corresponding test instructions to the second energy storage and charging device 300. The test instructions include, but are not limited to the V2V mode of the second energy storage and charging device 300, and V2V parameters: V2V voltage, V2V current, and V2V power. The charging parameters are consistent with the V2V parameters to verify the charging function of the first energy storage and charging device 200 and the V2V function of the second energy storage and charging device 300. During verification, the first energy storage and charging device 200 and the second energy storage and charging device 300 can send operating data during the test to the test control unit 120, and the test control unit 120 analyzes and processes the data and generates a test report, which is not specifically limited herein.

Similarly, the test control unit 120 can simulate the BMS of the vehicle to communicate with the second energy storage and charging device 300 in accordance with the national standard charging protocol, so as to send corresponding test instructions to the second energy storage and charging device 300. In addition, the test control unit 120 can simulate the BMS of the vehicle to communicate with the first energy storage and charging device 200 in accordance with the national standard V2V protocol, so as to send corresponding test instructions to the first energy storage and charging device 200 to verify the charging function of the second energy storage and charging device 300 and the V2V function of the first energy storage and charging device 200.

For example, referring to FIG. 2, the test control unit 120 may include a controller 123 and a communication assembly. The communication assembly includes a first communication assembly 121 and a second communication assembly 122. Both the first communication assembly 121 and the second communication assembly 122 support multiple communication protocols, such as the national standard charging protocol and the national standard V2X protocol.

During the charge and discharge test, the controller 123 can simulate the BMS of the vehicle to communicate with the first energy storage and charging device 200 via the first communication assembly 121 in accordance with the national standard charging protocol, so as to send corresponding test instructions to the first energy storage and charging device 200. In addition, the controller 123 can simulate the BMS of the vehicle to communicate with the second energy storage and charging device 300 via the second communication assembly 122 in accordance with the national standard V2V protocol, so as to send corresponding test instructions to the second energy storage and charging device 300.

Similarly, the controller 123 can simulate the BMS of the vehicle to communicate with the second energy storage and charging device 300 via the second communication assembly 122 in accordance with the national standard charging protocol, so as to send corresponding test instructions to the second energy storage and charging device 300. In addition, the controller 123 can simulate the BMS of the vehicle to communicate with the first energy storage and charging device 200 via the first communication assembly 121 in accordance with the national standard V2V protocol, so as to send corresponding test instructions to the first energy storage and charging device 200 to verify the charging function of the second energy storage and charging device 300 and the V2V function of the first energy storage and charging device 200.

It should be noted that when the energy storage and charging device operates in V2G mode, the test control unit 120 simulates the grid to communicate with a corresponding energy storage and charging device in accordance with the national standard V2G protocol or the like. When the energy storage and charging device operates in the V2L mode, the test control unit 120 simulates a load to communicate with a corresponding energy storage and charging device in accordance with the national standard V2L protocol or the like. When the energy storage and charging device operates in the V2H mode, the test control unit 120 simulates user equipment to communicate with a corresponding energy storage and charging device in accordance with the national standard V2H protocol or the like.

It should be noted that the above specific protocols can be selected based on actual conditions, the selection being not limited herein.

In the above embodiments, the testing apparatus incorporates different communication protocols to communicate with the energy storage and charging devices based on these protocols, so as to achieve test instruction issuing or the like, meeting the corresponding test requirements.

Figure 3:
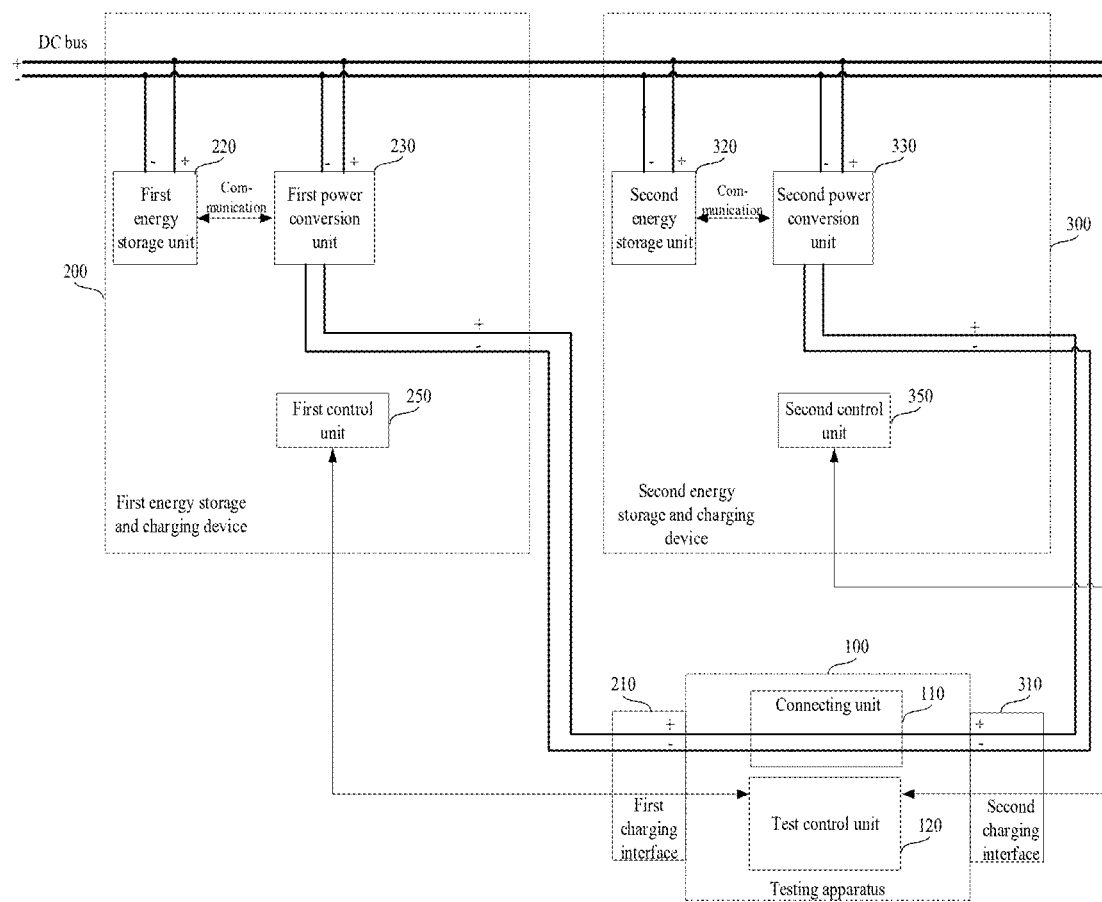
FIG. 3 is a schematic structural diagram of a testing apparatus according to a third embodiment of this disclosure.

In some embodiments, referring to FIG. 3, the first energy storage and charging device 200 includes a first energy storage unit 220 and a first power conversion unit 230, the first energy storage unit 220 is electrically connected to a direct-current bus, the first power conversion unit 230 is electrically connected to both the direct-current bus and the power interface in the first charging interface 210, the second energy storage and charging device 300 includes a second energy storage unit 320 and a second power conversion unit 330, the second energy storage unit 320 is electrically connected to the direct-current bus, the second power conversion unit 330 is electrically connected to both the direct-current bus and the power interface in the second charging interface 310.

When the first energy storage and charging device 200 is in the charging mode, and the second energy storage and charging device 300 is in a V2V mode, an electrical energy of the first energy storage unit 220 is transmitted to the second energy storage unit 320 sequentially through the direct-current bus, the first power conversion unit 230, the first charging interface 210, the connecting unit 110, the second charging interface 310, the second power conversion unit 330, and the direct-current bus; and when the second energy storage and charging device 300 is in the charging mode, and the first energy storage and charging device 200 is in a V2V mode, an electrical energy of the second energy storage unit 320 is transmitted to the first energy storage unit 220 sequentially through the direct-current bus, the second power conversion unit 330, the second charging interface 310, the connecting unit 110, the first charging interface 210, the first power conversion unit 230, and the direct-current bus.

It should be noted that the first energy storage unit 220 and the second energy storage unit 320 may include one or more battery units. The multiple battery units may be connected in series, parallel, or series-parallel. Each battery unit may be a single battery cell or formed by connecting multiple battery cells in series, parallel, or series-parallel. In some embodiments, the first energy storage unit 220 and the second energy storage unit 320 may also include battery management units that communicate with corresponding power conversion units to exchange relevant data.

The first power conversion unit 230 and the second power conversion unit 330 may include bidirectional DCDC conversion circuits, such as BUCK-BOOST circuits with power factor correction.

During the test, the test control unit 120 can control the first power conversion unit 230 to operate, such that a first electrical energy of the first energy storage unit 220 is converted into a second electrical energy and transmitted to the second power conversion unit 330 through the first charging interface 210, the connecting unit 110, and the second charging interface 310. At the same time, the test control unit 120 controls the second power conversion unit 330 to operate, converting the second electrical energy into a third electrical energy to charge the second energy storage unit 320. In this case, relative to the first energy storage and charging device 200, the second energy storage and charging device 300 is equivalent to a vehicle, the second power conversion unit 330 is equivalent to an onboard charger, and the second energy storage unit 320 is equivalent to a traction battery, thus implementing the charging function test on the first energy storage and charging device 200, so as to, for example, charge the vehicle. In addition, relative to the second energy storage and charging device 300, the first energy storage and charging device 200 is equivalent to a vehicle, and the first energy storage unit 220 is equivalent to a traction battery, providing electrical energy to the second energy storage and charging device 300, thus implementing the V2V function test on the second energy storage and charging device 300.

It should be noted that because the first energy storage and charging device 200 and the second energy storage and charging device 300 share the direct-current bus, the third electrical energy can also be transmitted to the first power conversion unit 230, but this does not affect the test.

Similarly, the test control unit 120 can control the second power conversion unit 330 to operate, such that a first electrical energy of the second energy storage unit 320 is converted into a second electrical energy and transmitted to the first power conversion unit 230 through the second charging interface 310, the connecting unit 110, and the first charging interface 210. At the same time, the test control unit 120 controls the first power conversion unit 230 to operate, converting the second electrical energy into the third electrical energy to charge the first energy storage unit 220. In this case, relative to the second energy storage and charging device 300, the first energy storage and charging device 200 is equivalent to a vehicle, the first power conversion unit 230 is equivalent to an onboard charger, and the first energy storage unit 220 is equivalent to a traction battery, thus implementing the charging function test on the second energy storage and charging device 300, so as to, for example, charge the vehicle. In addition, relative to the first energy storage and charging device 200, the second energy storage and charging device 300 is equivalent to a vehicle, and the second energy storage unit 320 is equivalent to a traction battery, providing electrical energy to the first energy storage and charging device 200, thus implementing the V2V function test on the first energy storage and charging device 200.

It should be noted that because the first energy storage and charging device 200 and the second energy storage and charging device 300 share the direct-current bus, the third electrical energy can also be transmitted to the second power conversion unit 330, but this does not affect the test.

In this embodiment, the charging function and V2V function tests of the energy storage and charging devices can be implemented, and because the two energy storage and charging devices share the direct-current bus, the tests can be performed without an alternating-current grid.

Figure 4:
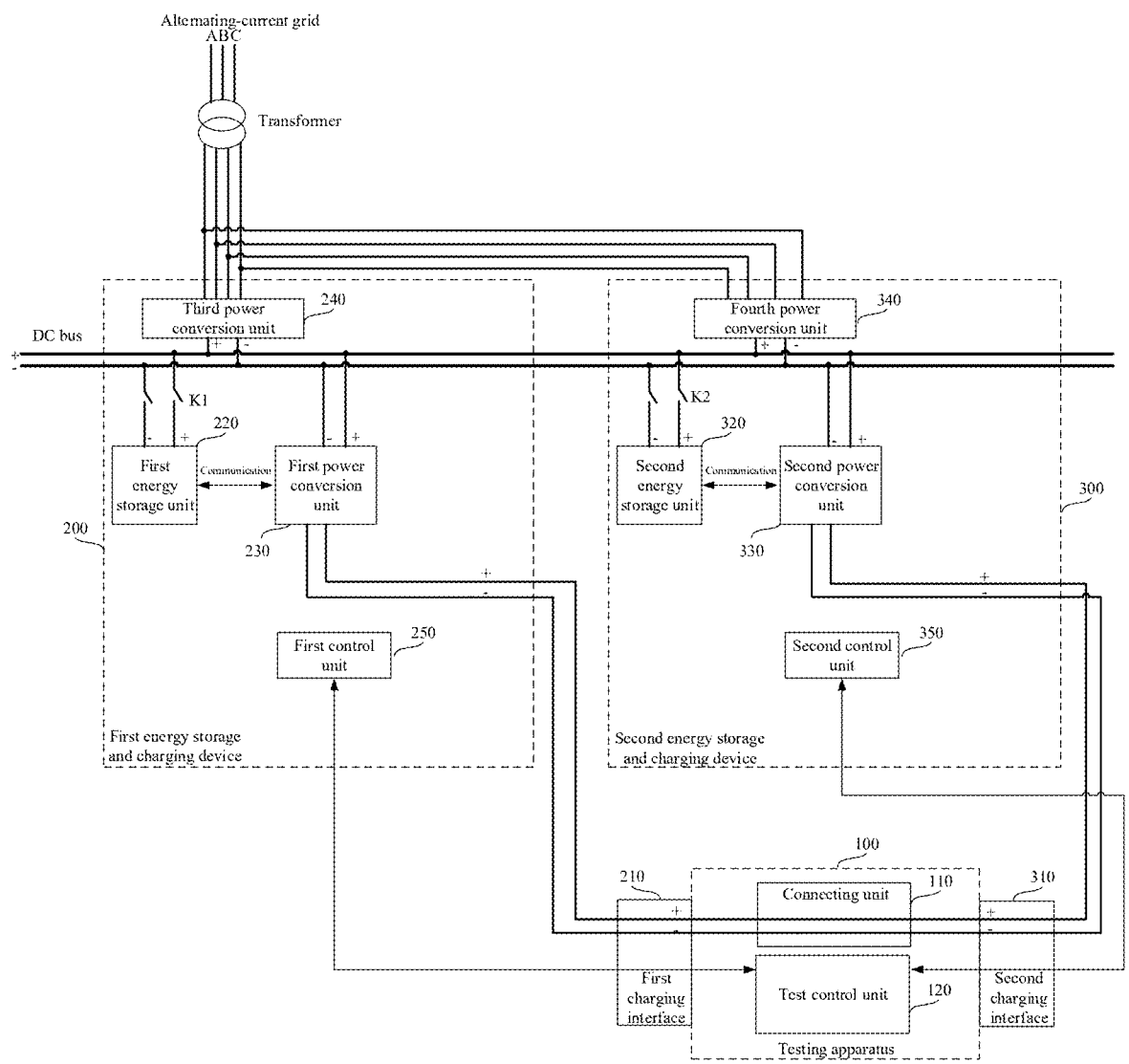
FIG. 4 is a schematic structural diagram of a testing apparatus according to a fourth embodiment of this disclosure.

In some embodiments, referring to FIG. 4, the first energy storage unit 220 is electrically connected to the direct-current bus via a first switch K1, the second energy storage unit 320 is electrically connected to the direct-current bus via a second switch K2, the first energy storage and charging device 200 further includes a third power conversion unit 240, the third power conversion unit 240 is electrically connected to both the direct-current bus and an alternating-current grid, the second energy storage and charging device 300 further includes a fourth power conversion unit 340, and the fourth power conversion unit 340 is electrically connected to both the direct-current bus and the alternating-current grid.

When the first energy storage and charging device 200 is in the charging mode, and the second energy storage and charging device 300 is in a V2G mode, the first switch K1 is connected, and the electrical energy of the first energy storage unit 220 is transmitted to the alternating-current grid sequentially through the direct-current bus, the first power conversion unit 230, the first charging interface 210, the connecting unit 110, the second charging interface 310, the second power conversion unit 330, the direct-current bus, and the fourth power conversion unit 340; and when the second energy storage and charging device 300 is in the charging mode, and the first energy storage and charging device 200 is in a V2G mode, the second switch K2 is connected, and the electrical energy of the second energy storage unit 320 is transmitted to the alternating-current grid sequentially through the direct-current bus, the second power conversion unit 330, the second charging interface 310, the connecting unit 110, the first charging interface 210, the first power conversion unit 230, the direct-current bus, and the third power conversion unit 240.

It should be noted that the third power conversion unit 240 and the fourth power conversion unit 340 may include bidirectional ACDC conversion circuits. For example, when the alternating-current grid supplies power in a three-phase four-wire system, it may be a bidirectional three-phase four-wire rectification circuit. When the alternating-current grid supplies power in a three-phase three-wire system, it may be a bidirectional three-phase three-wire rectification circuit. When the alternating-current grid supplies power in a single-phase system, it may be a bidirectional single-phase rectification circuit.

During the test, the test control unit 120 can control the first switch K1 to be closed and control the first power conversion unit 230 to operate, such that the first electrical energy of the first energy storage unit 220 is converted into the second electrical energy and is transmitted to the second power conversion unit 330 via the first charging interface 210, the connecting unit 110, and the second charging interface 310. In addition, the test control unit 120 controls the second switch K2 to be opened and controls the second power conversion unit 330 and the fourth power conversion unit 340 to operate, feeding the second electrical energy to the alternating-current grid. In this case, relative to the first energy storage and charging device 200, the second energy storage and charging device 300 is equivalent to a vehicle, thus implementing the charging function test on the first energy storage and charging device 200, so as to, for example, charge the vehicle. In addition, relative to the second energy storage and charging device 300, the first energy storage and charging device 200 is equivalent to a vehicle, thus implementing the V2G function test on the second energy storage and charging device 300.

It should be noted that in this example, the test control unit 120 can also control the second switch K2 to be closed and control the second power conversion unit 330 to operate, thus implementing the V2V function test on the second energy storage and charging device 300. In other words, in this example, both the V2V function test and the V2G function test can be performed on the second energy storage and charging device 300.

Similarly, the test control unit 120 can control the second switch K2 to be closed and control the second power conversion unit 330 to operate, such that the first electrical energy of the second energy storage unit 320 is converted into the second electrical energy and is transmitted to the first power conversion unit 230 via the second charging interface 310, the connecting unit 110, and the first charging interface 210. In addition, the test control unit 120 controls the first switch K1 to be opened and controls the first power conversion unit 230 and the third power conversion unit 240 to operate, feeding the second electrical energy to the alternating-current grid. In this case, relative to the second energy storage and charging device 300, the first energy storage and charging device 200 is equivalent to a vehicle, thus implementing the charging function test on the second energy storage and charging device 300, so as to, for example, charge the vehicle. In addition, relative to the first energy storage and charging device 200, the second energy storage and charging device 300 is equivalent to a vehicle, thus implementing the V2V function test on the first energy storage and charging device 200.

It should be noted that in this example, the test control unit 120 can also control the first switch K1 to be closed and control the first power conversion unit 230 to operate, thus implementing the V2V function test on the first energy storage and charging device 200. In other words, in this example, both the V2V function test and the V2G function test can be performed on the first energy storage and charging device 200.

In this embodiment, the charging function, V2V function, and V2G function tests can be implemented on the energy storage and charging devices.

Figure 5:
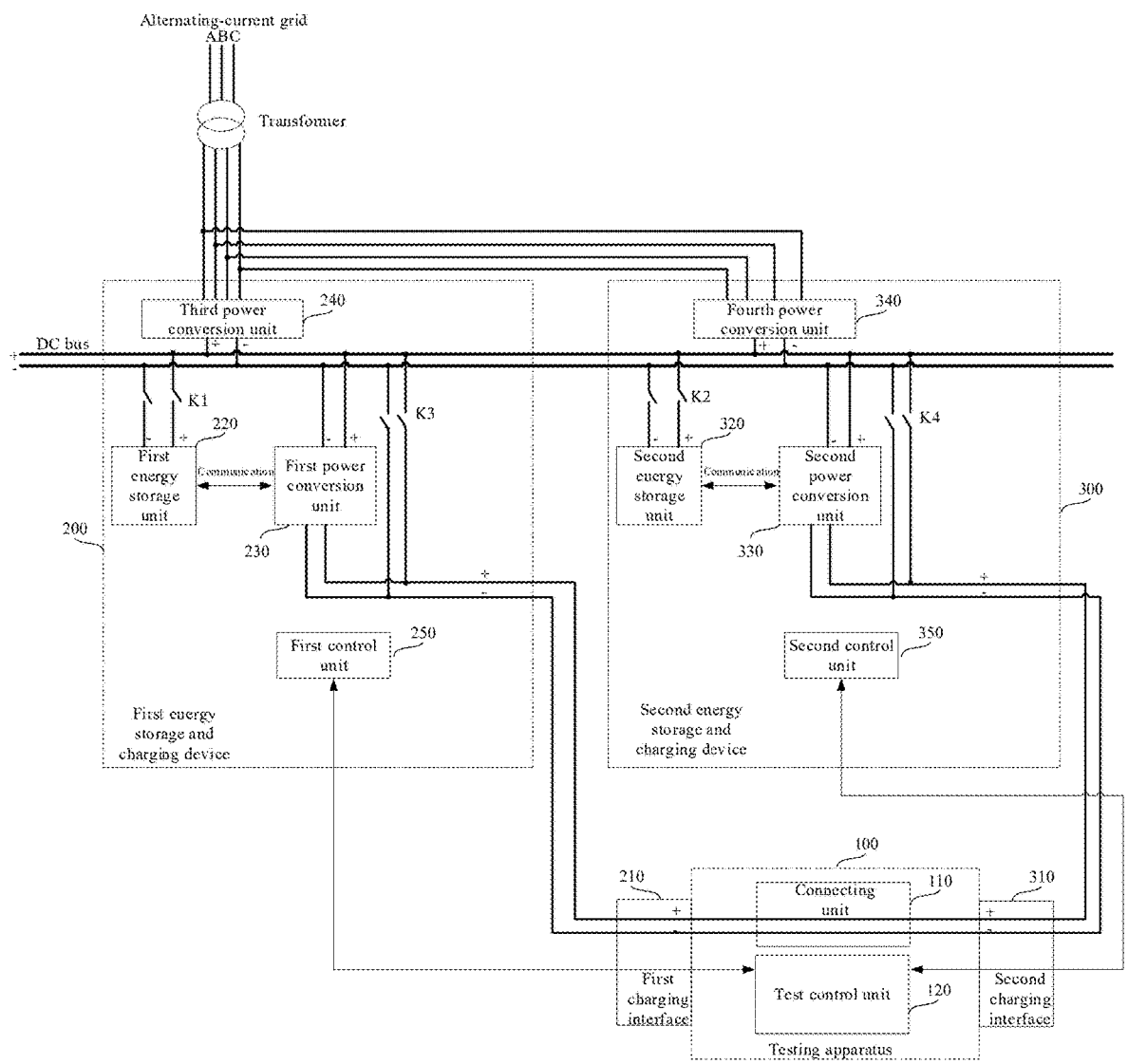
FIG. 5 is a schematic structural diagram of a testing apparatus according to a fifth embodiment of this disclosure.

In some embodiments, referring to FIG. 5, the first energy storage and charging device 200 further includes a third switch K3, the third switch K3 is connected to both the direct-current bus and the power interface in the first charging interface 210, the second energy storage and charging device 300 further includes a fourth switch K4, and the fourth switch K4 is connected to both the direct-current bus and the power interface in the second charging interface 310. When the first energy storage and charging device 200 is in the charging mode, and the second energy storage and charging device 300 is in a V2G mode, the fourth switch K4 is connected and the second power conversion unit 330 does not operate, or the fourth switch K4 is opened and the second power conversion unit 330 operates. Alternatively, when the second energy storage and charging device 300 is in the charging mode, and the first energy storage and charging device 200 is in the V2G mode, the third switch K3 is connected and the first power conversion unit 230 does not operate, or the third switch K3 is opened and the first power conversion unit 230 operates.

In other words, when the test control unit 120 controls the second energy storage and charging device 300 to be in the V2G mode, it can control the fourth switch K4 to be opened and control the second power conversion unit 330 and the fourth power conversion unit 340 to operate, feeding the second electrical energy to the alternating-current grid through the second power conversion unit 330 and the fourth power conversion unit 340; or control the fourth switch K4 to be connected and control the fourth power conversion unit 340 to operate, feeding the second electrical energy to the alternating-current grid through the fourth power conversion unit 340. In this way, the V2G function test can be performed on the second energy storage and charging device 300 for different pathways.

Similarly, when the test control unit 120 controls the first energy storage and charging device 200 to be in the V2G mode, it can control the third switch K3 to be opened and control the first power conversion unit 230 and the third power conversion unit 240 to operate, feeding the second electrical energy to the alternating-current grid through the first power conversion unit 230 and the third power conversion unit 240; or control the third switch K3 to be connected and control the third power conversion unit 240 to operate, feeding the second electrical energy to the alternating-current grid through the third power conversion unit 240. In this way, the V2G function test can be performed on the first energy storage and charging device 200 for different pathways.

In this embodiment, the V2G function test can be implemented on the energy storage and charging device through different pathways. This allows for a further test on the two power conversion units in the energy storage and charging devices. For example, the second power conversion unit and the fourth power conversion unit can be enabled to operate first. If an issue is found during the test, the fourth power conversion unit can be enabled to operate, so as to further determine the source of the issue.

Figure 6:
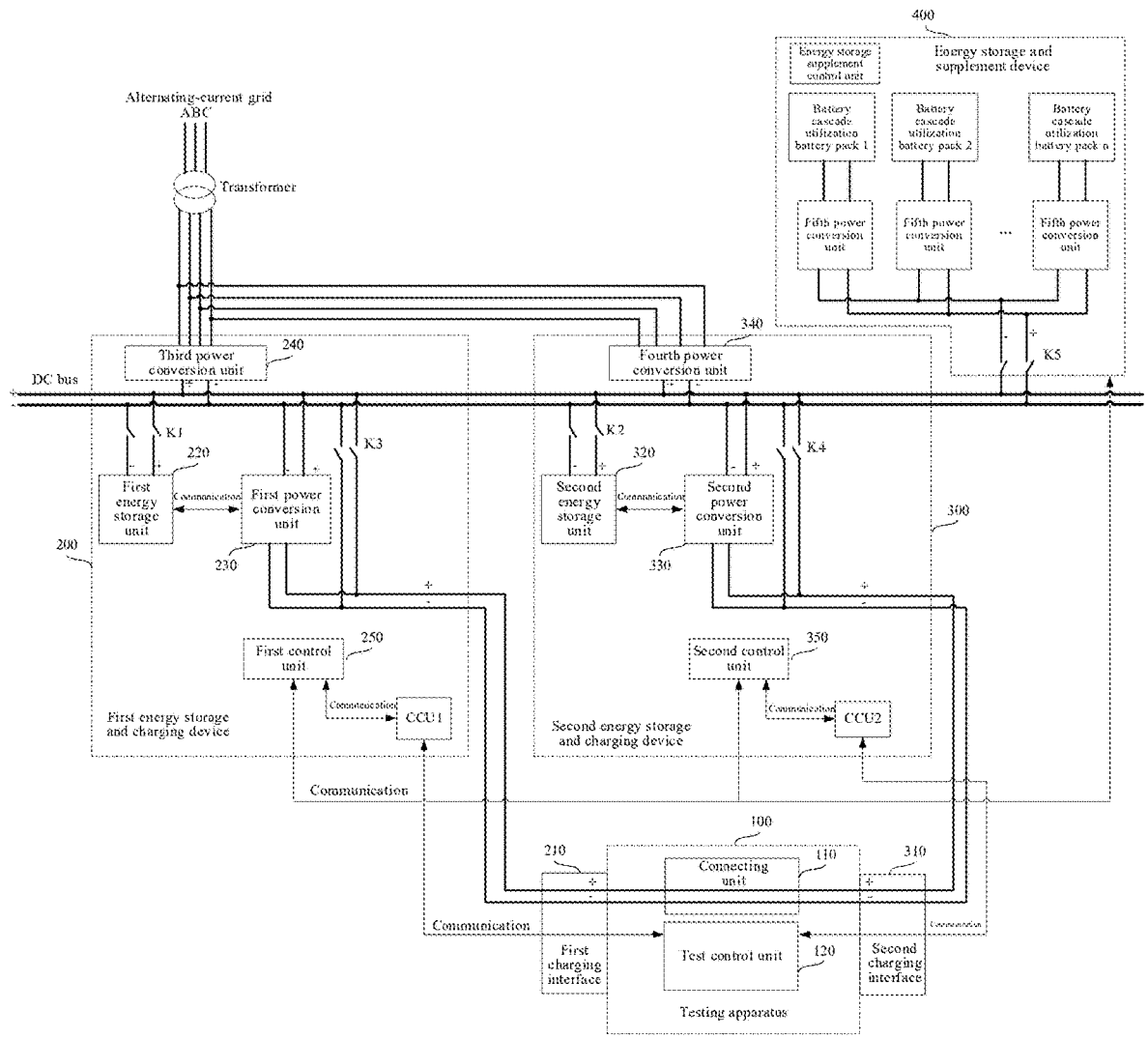
FIG. 6 is a schematic structural diagram of a testing apparatus according to a sixth embodiment of this disclosure.

In some embodiments, referring to FIG. 6, the direct-current bus is also configured to connect to an energy storage and supplement device 400. When the first energy storage and charging device 200 is in the charging mode, and the second energy storage and charging device 300 is in a V2L mode, the first switch K1 is connected, and an electrical energy of the first energy storage unit 220 is transmitted to the energy storage and supplement device 400 sequentially through the direct-current bus, the first power conversion unit 230, the first charging interface 210, the connecting unit 110, the second charging interface 310, the second power conversion unit 330, and the direct-current bus; and when the second energy storage and charging device 300 is in the charging mode, and the first energy storage and charging device 200 is in a V2L mode, the second switch K2 is connected, and an electrical energy of the second energy storage unit 320 is transmitted to the energy storage and supplement device 400 sequentially through the direct-current bus, the second power conversion unit 330, the second charging interface 310, the connecting unit 110, the first charging interface 210, the first power conversion unit 230, and the direct-current bus.

It should be noted that the energy storage and supplement device 400 may include n (where n is a positive integer) energy storage modules. Each energy storage module includes a fifth power conversion unit and a battery cascade utilization battery pack. The fifth power conversion unit is electrically connected to both the direct-current bus and the battery cascade utilization battery pack. The fifth power conversion unit may include a bidirectional DCDC conversion circuit, such as a BUCK-BOOST circuit with power factor correction. In some embodiments, the energy storage and supplement device 400 may also include a fifth switch K5. The fifth power conversion unit in each energy storage module is electrically connected to the direct-current bus via the fifth switch K5.

During the test, the test control unit 120 can control the first switch K1 to be closed and control the first power conversion unit 230 to operate, such that the first electrical energy of the first energy storage unit 220 is converted into the second electrical energy and is transmitted to the second power conversion unit 330 via the first charging interface 210, the connecting unit 110, and the second charging interface 310. In addition, the test control unit 120 controls the second switch K2 to be opened, controls the second power conversion unit 330 to operate or the fourth switch K4 to be closed, and controls the energy storage and supplement device 400 to operate, such that the energy storage and supplement device 400 is used as a load to consume the second electrical energy. In this case, relative to the first energy storage and charging device 200, the second energy storage and charging device 300 is equivalent to a vehicle, thus implementing the charging function test on the first energy storage and charging device 200, so as to, for example, charge the vehicle. In addition, relative to the second energy storage and charging device 300, the first energy storage and charging device 200 is equivalent to a vehicle, thus implementing the V2L function test on the second energy storage and charging device 300.

It should be noted that in this example, the test control unit 120 can also control the second switch K2 to be closed and control the second power conversion unit 330 to operate, thus performing the V2V function test on the second energy storage and charging device 300. It can also control the second switch K2 to be opened and control the second power conversion unit 330 and the fourth power conversion unit 340 to operate, or control the fourth switch K4 to be closed and control the fourth power conversion unit 340 to operate, thus performing the V2G function test on the second energy storage and charging device 300. In other words, in this example, all the V2V function test, the V2G function test, and the V2L function test can be performed on the second energy storage and charging device 300.

Similarly, the test control unit 120 can control the second switch K2 to be closed and control the second power conversion unit 330 to operate, such that the first electrical energy of the second energy storage unit 320 is converted into the second electrical energy and is transmitted to the first power conversion unit 230 via the second charging interface 310, the connecting unit 110, and the first charging interface 210. In addition, the test control unit 120 controls the first switch K1 to be opened, controls the first power conversion unit 230 to operate or the third switch K3 to be closed, and controls the energy storage and supplement device 400 to operate, such that the energy storage and supplement device 400 is used as a load to consume the second electrical energy. In this case, relative to the second energy storage and charging device 300, the first energy storage and charging device 200 is equivalent to a vehicle, thus implementing the charging function test on the second energy storage and charging device 300, so as to, for example, charge the vehicle. In addition, relative to the first energy storage and charging device 200, the second energy storage and charging device 300 is equivalent to a vehicle, thus implementing the V2L function test on the first energy storage and charging device 200.

It should be noted that in this example, the test control unit 120 can also control the first switch K1 to be closed and control the first power conversion unit 230 to operate, thus performing the V2V function test on the first energy storage and charging device 200. It can also control the first switch K1 to be opened and control the first power conversion unit 230 and the third power conversion unit 240 to operate, or control the third switch K3 to be closed and control the third power conversion unit 240 to operate, thus performing the V2G function test on the first energy storage and charging device 200. In other words, in this example, all the V2V function test, the V2G function test, and the V2L function test can be performed on the first energy storage and charging device 200.

In this embodiment, the charging function, V2V function, V2G function, and V2L function tests can be implemented on the energy storage and charging devices.

In some embodiments, referring to FIG. 6, the first energy storage and charging device 200 includes a first control unit 250, the second energy storage and charging device 300 includes a second control unit 350, and the test control unit 120 separately communicates with the first control unit 250 and the second control unit 350, to control the first energy storage and charging device 200 and the second energy storage and charging device 300 for the charge and discharge test via the first control unit 250 and the second control unit 350. In other words, the test control unit 120 can communicate with the control units in the energy storage and charging devices via the signal interfaces in the charging interfaces. The control units in the energy storage and charging devices control the power conversion units, switches, or the like in the energy storage and charging devices.

It should be noted that the test control unit 120 can perform communication control on the energy storage and supplement device 400 through a wired or wireless communication method or via the first control unit 250 and the second control unit 350. As shown in FIG. 6, the first control unit 250 and the second control unit 350 are both communicatively connected to the energy storage and supplement control unit in the energy storage and supplement device 400. The test control unit 120 can send corresponding test instructions to the energy storage and supplement control unit via the first control unit 250 or the second control unit 350 to control the energy storage and supplement device 400.

In some embodiments, still referring to FIG. 6, the first energy storage and charging device 200 may also include a CCU1 (Combined Charging Unit, Combined Charging Unit), and the CCU1 is arranged between the first control unit 250 and the signal interface of the first charging interface 210. The second energy storage and charging device 300 may also include a CCU2, and the CCU2 is arranged between the second control unit 350 and the signal interface of the second charging interface 310. The test control unit 120 can communicate with the control units in the energy storage and charging devices via the signal interfaces in the charging interfaces and the CCUs in the energy storage and charging devices. It can be understood that the CCU1 may further be integrated in the first control unit 250, and the CCU2 may further be integrated in the second control unit 350, without limitation herein.

Figure 7:
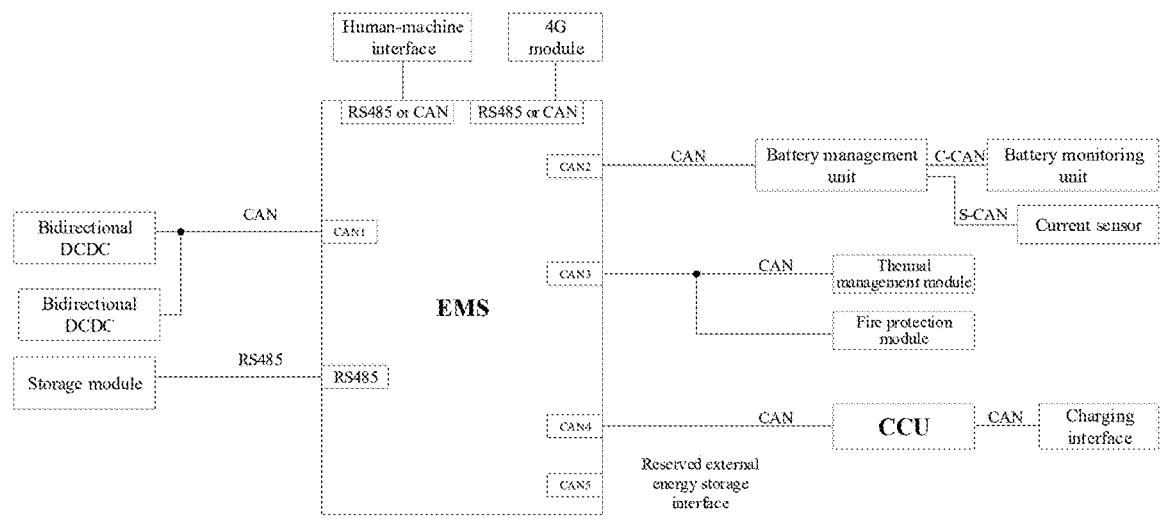
FIG. 7 is a schematic structural diagram of a control unit according to an embodiment of this disclosure.

In some embodiments, the first control unit 250 and the second control unit 350 may adopt an EMS (Energy Management System, Energy Management System) as shown in FIG. 7. Referring to FIG. 7, the EMS communicates with the bidirectional DCDC and bidirectional ACDC via a CAN1 to control the bidirectional DCDC and bidirectional ACDC. For example, in the first energy storage and charging device 200, the bidirectional DCDC is the first power conversion unit 230, and the bidirectional ACDC is the third power conversion unit 240. The EMS communicates with the battery management unit via a CAN2. The battery management unit also communicates with a battery monitoring unit via a C-CAN and communicates with a current sensor via an S-CAN to monitor the battery status. For example, in the first energy storage and charging device 200, the battery is the first energy storage unit 220. The EMS also communicates with the charging interface via a CAN4 and a CCU, and further communicates with the test control unit 120. The EMS also communicates with a thermal management module and a fire protection module via a CAN3 to achieve thermal management control and fire protection control. For example, the thermal management module and the fire protection module are arranged in the first energy storage and charging device 200 to protect the device. The EMS also communicates with a storage module via an RS485 for data storage. A CAN5 of the EMS is a reserved external energy storage interface, which can communicate with the energy storage and supplement device 400. The EMS may also communicate with the 4G module via the RS485 or CAN for wireless communication or communicate with a human-machine interface for displaying related information or the like. It should be noted that FIG. 7 is only an exemplary description and may include other interfaces or functions, without limitation herein.

In summary, in the technical solutions of the embodiments of this disclosure, the power interfaces in the charging interfaces of two energy storage and charging devices are connected via the connecting unit, so as to electrically connect the two energy storage and charging devices. The test control unit is separately connected to the signal interfaces in the charging interfaces of the two energy storage and charging devices, so as to separately communicate with the two energy storage and charging devices, thus performing the charge and discharge test on the two energy storage and charging devices. Thus, the testing apparatus electrically connects the two energy storage and charging devices and communicates with the two energy storage and charging devices to control the two energy storage and charging devices for charge and discharge, thus implementing the bidirectional charge and discharge test on the two energy storage and charging devices, ensuring a convenient test. Additionally, the testing apparatus has a small volume and low costs, thereby facilitating on-site maintenance and debugging.

The charging system of this disclosure is described with reference to specific embodiments.

Referring to FIG. 1, the charging system includes a first energy storage and charging device 200 and a second energy storage and charging device 300. The first energy storage and charging device 200 has a first charging interface 210; and the second energy storage and charging device 300 has a second charging interface 310. During the charge and discharge test on the first energy storage and charging device 200 and the second energy storage and charging device 300, the above testing apparatus 100 is used to connect to the first charging interface 210 and the second charging interface 310, to perform the charge and discharge test on the first energy storage and charging device 200 and the second energy storage and charging device 300.

It should be noted that reference can be made to the aforementioned description for the specific structures of the first energy storage and charging device 200 and the second energy storage and charging device 300 as well as the test process of the testing apparatus 100 on the first energy storage and charging device 200 and the second energy storage and charging device 300, which is not elaborated herein.

Additionally, the charging system may also include more energy storage and charging devices with the same structure as the first energy storage and charging device 200 and the second energy storage and charging device 300, which all can be subjected to the charge and discharge test using the testing apparatus 100. In other words, the charging system can include at least two energy storage and charging devices, and each energy storage and charging device has a charging interface. When the charge and discharge test is performed on the at least two energy storage and charging devices, the foregoing testing apparatus can be used to be connected to charging interfaces of any two energy storage and charging devices, to perform the charge and discharge test on any two energy storage and charging devices. The structure of each energy storage and charging device is the same as the circuit structure of the aforementioned first energy storage and charging device 200 and second energy storage and charging device 300.

In conclusion, it should be noted that the above embodiments are merely intended for describing the technical solutions of this disclosure but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this disclosure. They should all be covered in the scope of the claims and specification of this disclosure. In particular, as long as there is no structural conflict, the various technical features mentioned in the implementations can be combined in any manners. This disclosure is not limited to the specific embodiments disclosed in this specification, but includes all technical solutions falling within the scope of the claims.

What is claimed is:

1. A testing apparatus configured to perform a charge and discharge test on a first energy storage and charging device and a second energy storage and charging device, wherein the first energy storage and charging device has a first charging interface, the second energy storage and charging device has a second charging interface, the apparatus comprising:
   a connecting unit, wherein the connecting unit is configured to connect a power interface in the first charging interface and a power interface in the second charging interface, so as to electrically connect the first energy storage and charging device and the second energy storage and charging device; and
   a test control unit, wherein the test control unit is configured to connect to a signal interface in the first charging interface and a signal interface in the second charging interface to separately communicate with the first energy storage and charging device and the second energy storage and charging device, so as to control the first energy storage and charging device and the second energy storage and charging device for the charge and discharge test;
   wherein:
   the first energy storage and charging device comprises a first power conversion unit and a first switch, each of a first end of the first power conversion unit and a first end of the first switch is directly connected to a direct-current bus, and each of a second end of the first power conversion unit and a second end of the first switch is directly connected to the power interface in the first charging interface; and
   the second energy storage and charging device comprises a second power conversion unit and a second switch, each of a first end of the second power conversion unit and a first end of the second switch is directly connected to the direct-current bus, and each of a second end of the second power conversion unit and a second end of the second switch is directly connected to the power interface in the second charging interface.

2. The testing apparatus according to claim 1, wherein during the charge and discharge test:
   the first energy storage and charging device is in a charging mode, and the second energy storage and charging device is in a vehicle-to-X (V2X) mode, so as to perform a charging function test on the first energy storage and charging device and a V2X function test on the second energy storage and charging device; or
   the second energy storage and charging device is in the charging mode, and the first energy storage and charging device is in the V2X mode, so as to perform the charging function test on the second energy storage and charging device and the V2X function test on the first energy storage and charging device.

3. The testing apparatus according to claim 2, wherein:
   the first energy storage and charging device further comprises a first energy storage unit, the first energy storage unit is electrically connected to the direct-current bus, the second energy storage and charging device further comprises a second energy storage unit, the second energy storage unit is electrically connected to the direct-current bus;
   when the first energy storage and charging device is in the charging mode, and the second energy storage and charging device is in a vehicle-to-vehicle (V2V) mode, an electrical energy of the first energy storage unit is transmitted to the second energy storage unit sequentially through the direct-current bus, the first power conversion unit, the first charging interface, the connecting unit, the second charging interface, the second power conversion unit, and the direct-current bus; and
   when the second energy storage and charging device is in the charging mode, and the first energy storage and charging device is in the V2V mode, an electrical energy of the second energy storage unit is transmitted to the first energy storage unit sequentially through the direct-current bus, the second power conversion unit, the second charging interface, the connecting unit, the first charging interface, the first power conversion unit, and the direct-current bus.

4. The testing apparatus according to claim 3, wherein:
the first energy storage unit is electrically connected to the direct-current bus via a third switch, the second energy storage unit is electrically connected to the direct-current bus via a fourth switch, the first energy storage and charging device further comprises a third power conversion unit, the third power conversion unit is electrically connected to both the direct-current bus and an alternating-current grid, the second energy storage and charging device further comprises a fourth power conversion unit, and the fourth power conversion unit is electrically connected to both the direct-current bus and the alternating-current grid;

when the first energy storage and charging device is in the charging mode, and the second energy storage and charging device is in a vehicle-to-grid (V2G) mode, the third switch is connected, and the electrical energy of the first energy storage unit is transmitted to the alternating-current grid sequentially through the direct-current bus, the first power conversion unit, the first charging interface, the connecting unit, the second charging interface, the second power conversion unit, the direct-current bus, and the fourth power conversion unit; and when the second energy storage and charging device is in the charging mode, and the first energy storage and charging device is in the V2G mode, the fourth switch is connected, and the electrical energy of the second energy storage unit is transmitted to the alternating-current grid sequentially through the direct-current bus, the second power conversion unit, the second charging interface, the connecting unit, the first charging interface, the first power conversion unit, the direct-current bus, and the third power conversion unit.

5. The testing apparatus according to claim 4, wherein:
when the first energy storage and charging device is in the charging mode, and the second energy storage and charging device is in the V2G mode, the second switch is connected and the second power conversion unit does not operate, or the second switch is opened and the second power conversion unit operates; and
when the second energy storage and charging device is in the charging mode, and the first energy storage and charging device is in the V2G mode, the first switch is connected and the first power conversion unit does not operate, or the first switch is opened and the first power conversion unit operates.

6. The testing apparatus according to claim 4, wherein:
the direct-current bus is further is also configured to connect to an energy storage and supplement device;
when the first energy storage and charging device is in the charging mode, and the second energy storage and charging device is in a vehicle-to-load (V2L) mode, the third switch is connected, and the electrical energy of the first energy storage unit is transmitted to the energy storage and supplement device sequentially through the direct-current bus, the first power conversion unit, the first charging interface, the connecting unit, the second charging interface, the second power conversion unit, and the direct-current bus; and when the second energy storage and charging device is in the charging mode, and the first energy storage and charging device is in the V2L mode, the fourth switch is connected, and the electrical energy of the second energy storage unit is transmitted to the energy storage and supplement device sequentially through the direct-current bus, the second power conversion unit, the second charging interface, the connecting unit, the first charging interface, the first power conversion unit, and the direct-current bus.

7. The testing apparatus according to claim 1, wherein the connecting unit comprises a positive power wire and a negative power wire, two ends of the positive power wire are configured to connect to a positive power interface in the first charging interface and a positive power interface in the second charging interface respectively, and two ends of the negative power wire are configured to connect to a negative power interface in the first charging interface and a negative power interface in the second charging interface respectively.

8. The testing apparatus according to claim 1, wherein the test control unit comprises a communication assembly, and the communication assembly supports multiple communication protocols to allow the test control unit to communicate with different first energy storage and charging devices and second energy storage and charging devices.

9. The testing apparatus according to claim 1, wherein the first energy storage and charging device further comprises a first control unit, the second energy storage and charging device further comprises a second control unit, and the test control unit separately communicates with the first control unit and the second control unit, to control the first energy storage and charging device and the second energy storage and charging device for the charge and discharge test via the first control unit and the second control unit.

10. A charging system, comprising:
a first energy storage and charging device, wherein the first energy storage and charging device has a first charging interface, the first energy storage and charging device comprises a first power conversion unit electrically connected to both a direct-current bus and a power interface in the first charging interface, and the first power conversion unit comprises a bidirectional DC-DC conversion circuit;
a second energy storage and charging device, wherein the second energy storage and charging device has a second charging interface, the second energy storage and charging device comprises a second power conversion unit electrically connected to both the direct-current bus and a power interface in the second charging interface, and the second power conversion unit comprises a bidirectional DC-DC conversion circuit; and
the testing apparatus according to claim 1 configured to connect to the first charging interface and the second charging interface, to perform a charge and discharge test on the first energy storage and charging device and the second energy storage and charging device.

* * * * *